US012685970B2

(12) United States Patent
Dong et al.

(10) Patent No.: US 12,685,970 B2
(45) Date of Patent: Jul. 21, 2026

(54) METHOD FOR POST-TREATING CATALYST COATED MEMBRANES

(71) Applicant: UOP LLC, Des Plaines, IL (US)

(72) Inventors: Xueliang Dong, Schaumburg, IL (US); Chunqing Liu, Arlington Heights, IL (US); Howie Q. Tran, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 18/896,468

(22) Filed: Sep. 25, 2024

(65) Prior Publication Data

US 2026/0084114 A1      Mar. 26, 2026

(51) Int. Cl.
B01D 67/00          (2006.01)
B01J 37/00          (2006.01)

(52) U.S. Cl.
CPC ........ B01D 67/00933 (2022.08); B01J 37/00 (2013.01)

(58) Field of Classification Search
CPC .......... B01J 37/00; H01M 8/1004; B05C 3/10
See application file for complete search history.

(56)                References Cited

U.S. PATENT DOCUMENTS

2012/0161576 A1*   6/2012   Motoki .................. H01G 11/34
                                                                 977/773

* cited by examiner

*Primary Examiner* — Alex A Rolland

(57)                ABSTRACT

High efficiency CCM post-treatment methods are described. A multilayer CCM mesh cage has multiple shelves. Each CCM is placed in between one or two pieces of mesh and loaded into the multilayer CCM mesh cage, which is made of mesh so that the acid or base can contact the CCMs. Multiple CCM cages can be soaked in an acid tank at the same time. A circulation pump can be included in the acid or base tank to circulate the acid or base during the CCM post-treatment. Large batch of CCMs can be treated simultaneously.

19 Claims, 3 Drawing Sheets

100

110

110

105

METHOD FOR POST-TREATING CATALYST COATED MEMBRANES

BACKGROUND

Acid or base treatment is one step in the fabrication of catalyst coated membranes (CCM). The main purposes of this treatment are activating the CCM by soaking it in a diluted acid or base solution, enabling the counter ions in the membrane and ionomer to be converted to protons (H⁺) when acid solution is used or to be converted to hydroxide ions (OH⁻) when base solution is used, and removing water-soluble additives from the catalyst layers to form porous catalyst layers. The acid or base treated CCMs may be used in a wide variety of applications including, but not limited to, fuel cells: electrolyzers, such as water electrolyzers, $CO_2$ electrolyzers, and toluene electrolyzers; flow batteries; electrodialyzers; waste metal recovery systems; electrocatalytic hydrogen production systems; desalinators; water purifiers; waste water treatment systems; ion exchangers; or $CO_2$ separators.

Typically, a piece-by-piece CCM post-treatment method is used. Each CCM sheet is soaked in a dilute acid solution, such as HCl or $H_2SO_4$ aqueous solution, or base solution, such as NaOH or KOH aqueous solution, in a tray for at least 0.5 h. The acid or base treated CCM is rinsed with pure water, dried, and optionally hot pressed. It is then ready for use. This piece-by-piece CCM post-treatment method is time and labor consuming and is not efficient. It requires a large quantity of acid or base to keep the CCM well soaked in the acid or base solution. Moreover, during the water rinse and drying, there is a risk that the CCM could be damaged during handling.

Therefore, there is a need for a highly efficient CCM post-treatment method.

DESCRIPTION

Figure 1:
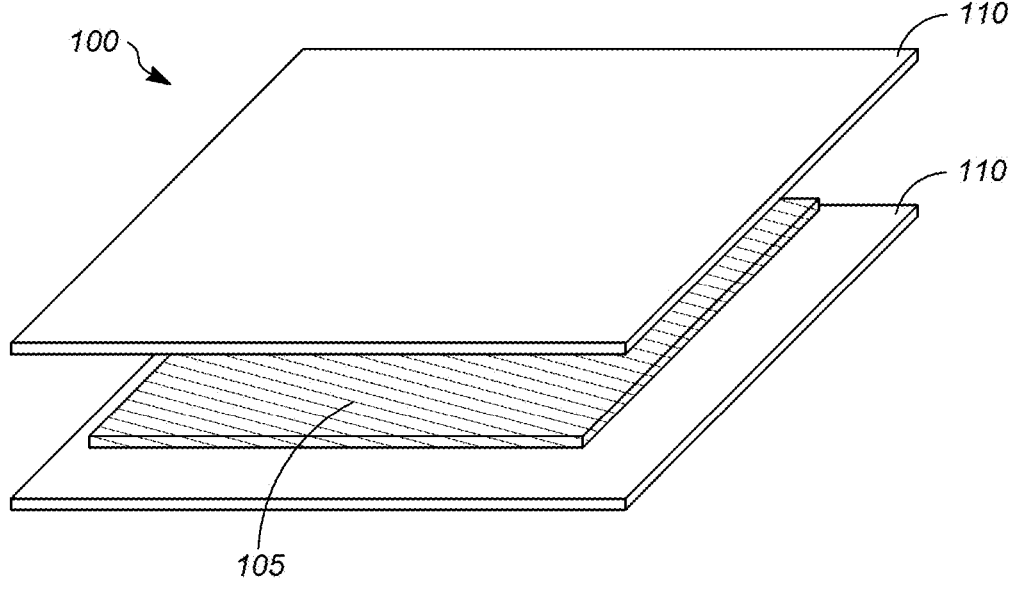
FIG. 1 is an illustration of a catalyst coated membrane covered with mesh on both sides.

The present invention presents a new CCM post-treatment method with high efficiency. A multilayer CCM mesh cage was designed for the post-treatment of a large batch of CCMs. The multilayer mesh cage resembles a shelving unit with multiple shelves. It is made of mesh so that the acid or base can contact the CCMs. Each CCM is placed in between one or two pieces of mesh and loaded into the multilayer CCM mesh cage. In some embodiments, each layer in the cage can hold one CCM, and each cage can hold more than 10 pieces CCMs. Multiple CCM cages can be soaked in an acid or base tank at the same time. A circulation pump can be included in the acid or base tank to circulate the acid or base during the CCM post-treatment. With this new design, a large batch of CCMs (can be more than 100 pieces) can be treated simultaneously, which significantly improved the CCM post-treatment efficiency. In some embodiments, the mesh covered CCMs can be stacked and placed in the acid or bath solution.

Compared with the piece-by-piece CCM post-treatment method, the new designed CCM post-treatment method offers several advantages. First, the CCM mesh cage design allows large batches of CCMs to be treated simultaneously, which significantly improves post-treatment efficiency. The water rinse and drying of the CCMs can be done in the CCM cages as well, which significantly simplifies the post-treatment process. In addition, the new method eliminates the need to handle the wet CCMs, significantly reduced the risk of CCM damage.

The CCM post-treatment method typically involves the following steps. The CCM is placed between two pieces of mesh which keeps the CCM flat and facilitates handling because the mesh is handled instead of the CCM. When a stack of CCM and mesh layers is used, the mesh layers can be alternated with the CCMs with a layer of mesh on the top and bottom, providing mesh layers on both sides of the CCM.

In some embodiments, the mesh is a plastic mesh. Suitable plastic mesh includes, but is not limited to, mesh made from nylon, polyimide, polyetherimide, polyethylene, polypropylene, polyethylene-co-polypropylene, polyamide, poly(vinyl chloride), polycarbonate, polylactic acid, polyethylene terephthalate, poly(ether ether ketone), poly(methyl methacrylate), polyphenylene sulfone, polysulfone, polyethersulfone, polystyrene, poly(vinyl acetate), polychlorotrifluoroethylene, polytetrafluoroethylene, acrylonitrile butadiene styrene, poly(vinylidene fluoride), or combinations thereof.

Individual mesh/CCM/mesh sets are loaded into the CCM mesh cage. In some embodiments, a single mesh/CCM/mesh unit is placed on each mesh shelf. In other embodiments, mesh/CCM/mesh units could be placed next to one another on a shelf. In some embodiments, a stack of alternating CCM/mesh units could be placed on a shelf, depending on the design of the mesh cage.

One or more CCM mesh cages with mesh/CCM/mesh or CCM/mesh units is placed into the acid or base tank. The level of the acid or base in the tank should be sufficient to completely cover the CCM units.

Alternatively, a stack of alternating CCM/mesh units could be placed in the acid or base bath without using the CCM mesh cage.

In some embodiments, there is acid or base circulation pump to circulate the acid or base throughout the tank.

The CCMs are typically in the acid or base bath for about 10 min to about 48 hr or for about 15 min to about 10 hr. The temperature of the acid or base bath is typically in the range of about 0° C. to about 100° C. or about 15° C. to about 80° C.

After the acid or base treatment is completed, the CCM mesh cages (or CCM/mesh stacks) are removed from the acid or base bath and rinsed with high purity water or ultrapure water with a water resistivity of at least 18.18 MΩ·cm at 25° C. Any suitable rinsing method can be used. In one embodiment, the CCM mesh cages (or the CCM/mesh stacks) are placed in a water tank to soak. The water tank can also have a pump if desired.

Following the water rinse, the CCMs are dried. Any suitable drying method can be used. Suitable drying methods include, are not limited to, air drying or drying in an oven.

The CCMs are removed from the mesh cages or unstacked for hot pressing and testing.

One aspect of the invention is method of post-treating a catalyst coated membrane. In one embodiment, the method comprises providing a catalyst coated membrane; placing a layer of mesh on a side of the catalyst coated membrane; soaking at least two sets of the catalyst coated membrane and the mesh layer in an acid or base bath forming at least two sets of an acid or base treated catalyst coated membrane and the mesh layer; removing the at least two sets of the catalyst coated membrane and the mesh layer from the acid or base bath; and rinsing the at least two sets of the acid or base treated catalyst coated membrane and the mesh layer with high purity water.

In some embodiments, the method further comprises drying the at least two sets of the acid or base treated catalyst coated membrane and the mesh layer.

In some embodiments, the method further comprises hot-pressing the dried at least two sets of the acid or base treated catalyst coated membrane.

In some embodiments, the method further comprises placing a second layer of mesh on a second side of the catalyst coated membrane before soaking the at least two sets of the catalyst coated membrane and the mesh layer in the acid or base bath.

In some embodiments, the at least two sets of the catalyst coated membrane and the mesh layer are stacked before soaking the at least two sets of the catalyst coated membrane and the mesh layer in an acid or base bath.

In some embodiments, the method further comprises placing the at least two sets of the catalyst coated membrane and the mesh layer in a multilayer mesh cage.

In some embodiments, the method further comprises placing each set of the catalyst coated membrane and the mesh layer on a separate layer of the multilayer mesh cage before soaking the at least two sets of the catalyst coated membrane and the mesh layer in the acid or base bath.

In some embodiments, rinsing the at least two sets of the acid or base treated catalyst coated membrane and mesh layer with the high purity water comprises rinsing the at least two sets of the acid or base treated catalyst coated membrane and mesh layer with the high purity water in the multilayer mesh cage.

In some embodiments, the method further comprises drying the at least two sets of the rinsed acid or base treated catalyst coated membrane and mesh layer in the multilayer mesh cage.

In some embodiments, a plurality of the multilayer mesh cages are placed in the acid or base bath.

In some embodiments, the multilayer mesh cage is made of a plastic.

In some embodiments, the plastic is made of nylon, polyimide, polyetherimide, polyethylene, polypropylene, polyethylene-co-polypropylene, polyamide, poly(vinyl chloride), polycarbonate, polylactic acid, polyethylene terephthalate, poly(ether ether ketone), poly(methyl methacrylate), polyphenylene polysulfone, polyethersulfone, polystyrene, poly(vinyl acetate), polychlorotrifluoroethylene, polytetrafluoroethylene, acrylonitrile butadiene styrene, poly(vinylidene fluoride), or combinations thereof.

In some embodiments, the mesh layer is made of a plastic.

In some embodiments, the plastic is made of nylon, polyimide, polyetherimide, polyethylene, polypropylene, polyethylene-co-polypropylene, polyamide, poly(vinyl chloride), polycarbonate, polylactic acid, polyethylene terephthalate, poly(ether ether ketone), poly(methyl methacrylate), polyphenylene sulfone, polysulfone, polyethersulfone, polystyrene, poly(vinyl acetate), polychlorotrifluoroethylene, polytetrafluoroethylene, acrylonitrile butadiene styrene, poly(vinylidene fluoride), or combinations thereof.

In some embodiments, the method further comprises circulating the acid or base in the acid or base bath.

In some embodiments, rinsing the at least two sets of the acid or base treated catalyst coated membrane and the mesh layer with the high purity water comprises placing the at least two sets of the acid or base treated catalyst coated membrane and mesh layer in a high purity water bath.

In some embodiments, the method further comprises circulating the high purity water in the high purity water bath.

In some embodiments, the catalyst coated membrane is a catalyst coated proton exchange membrane or a catalyst coated anion exchange membrane.

In some embodiments, the acid bath is used for post-treating the catalyst coated proton exchange membrane and the base bath is used for post-treating the catalyst coated anion exchange membrane.

In some embodiments, the acid bath comprises an aqueous acid solution with an acid concentration in a range of 0.01 M to 10 M and wherein the base bath comprises an aqueous base solution with a base concentration in a range of 0.01 M to 10 M.

Another aspect of the invention is a method of post-treating a catalyst coated membrane. In one embodiment, the method comprises: providing a catalyst coated membrane; placing a layer of mesh on both sides of the catalyst coated membrane forming a mesh covered catalyst coated membrane; providing a multilayer mesh cage; placing a plurality of the mesh covered catalyst coated membranes in the multilayer mesh cage; placing the multilayer mesh cage containing the mesh covered catalyst coated membrane in an acid or base bath and soaking the mesh covered catalyst coated membrane forming a plurality of mesh covered acid or base treated catalyst coated membranes; removing the plurality of mesh covered acid or base treated catalyst coated membranes from the acid or base bath; rinsing the plurality of mesh covered acid or base treated catalyst coated membranes with high purity water; and drying the plurality of mesh covered acid or base treated catalyst coated membranes.

FIG. 1 illustrates a mesh sandwiched CCM 100 comprising a CCM 105 with a layer of mesh 110 on each side.

Figure 2:
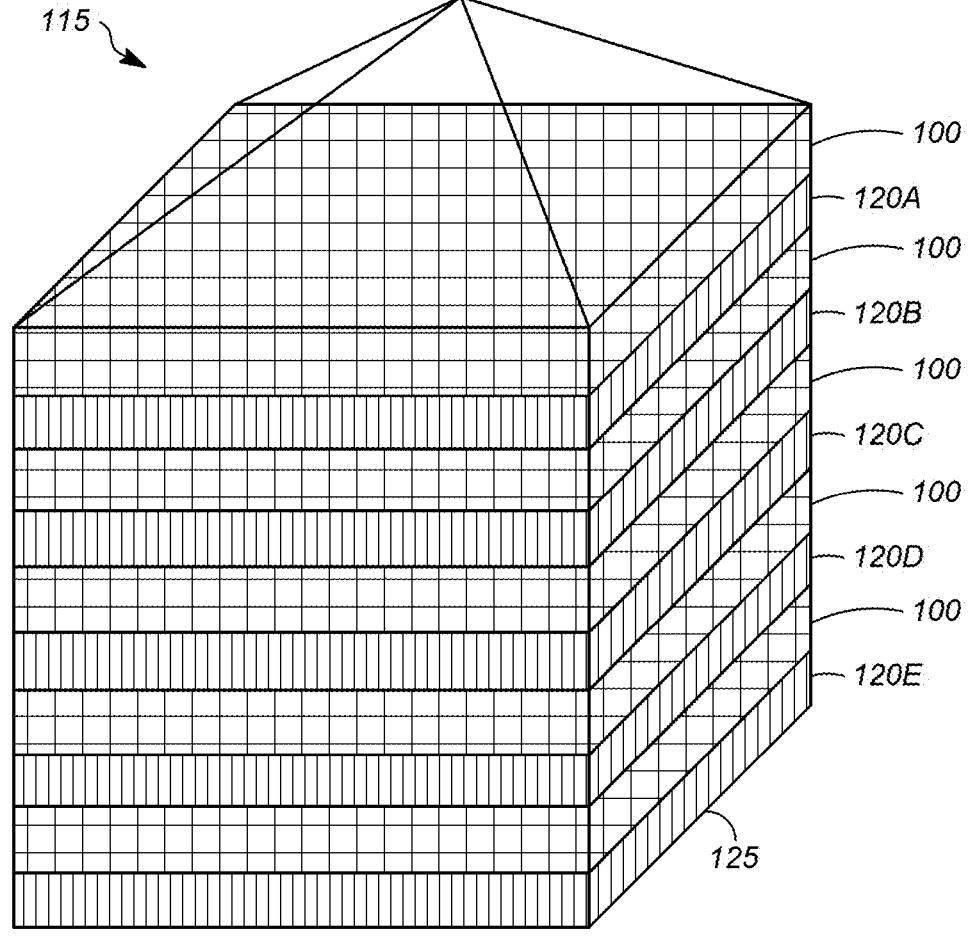
FIG. 2 is an illustration of one embodiment of a multilayer mesh cage.

FIG. 2 illustrates one embodiment of a mesh cage 115. It has a number of mesh shelves 120A-E. One of the sides 125 of the mesh cage 115 can be opened to allow the individual mesh sandwiched CCMs 100 to be placed on the shelves 120A-E. The side 125 is then closed.

Figure 3:
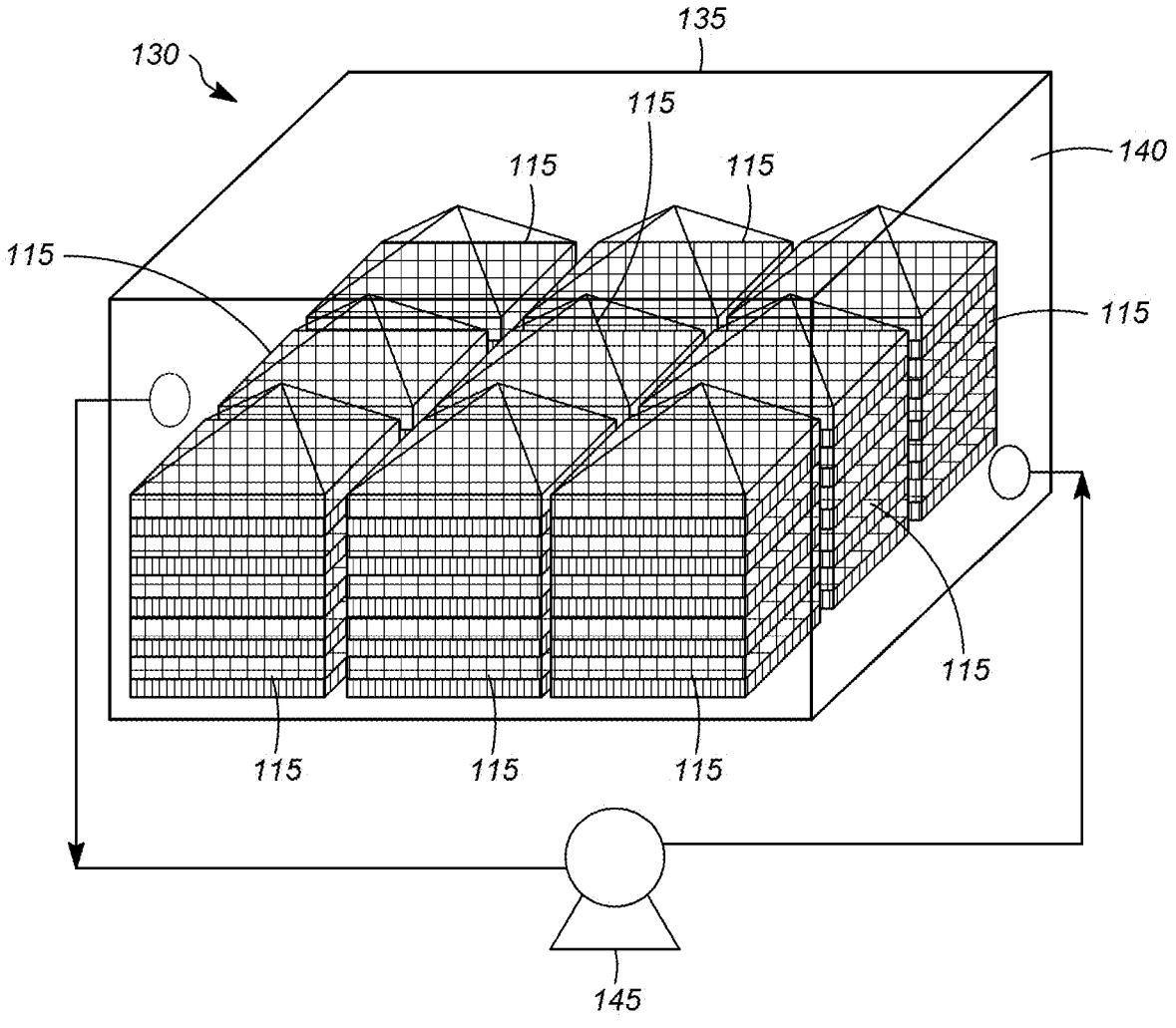
FIG. 3 is an illustration of one embodiment of a plurality of multilayer mesh cages containing mesh covered catalyst coated membranes in an acid or base bath.

FIG. 3 illustrates one embodiment of an acid or base bath 130. The acid or base bath 130 comprises a tank 135 filled with acid or base solution 140. Multiple mesh cages 115 containing mesh sandwiched CCMs are placed in the acid or base bath 130 for soaking.

The acid or base bath may include a circulation pump 145 to circulate the acid or base in the tank 135.

After the CCMs 105 have been treated in the acid or base bath 130 for a sufficient time, the mesh cages 115 are removed and the CCMs 105 are rinsed in high purity water. The CCMs can be rinsed in the mesh cages 115 in a water tank, similar to the soaking in the acid or base bath 130.

SPECIFIC EMBODIMENTS

While the following is described in conjunction with specific embodiments, it will be understood that this description is intended to illustrate and not limit the scope of the preceding description and the appended claims.

A first embodiment of the invention is a method of post-treating a catalyst coated membrane comprising providing a catalyst coated membrane; placing a layer of mesh on a side of the catalyst coated membrane; soaking at least two sets of the catalyst coated membrane and the mesh layer in an acid or base bath forming at least two sets of an acid or base treated catalyst coated membrane and the mesh layer; removing the at least two sets of the catalyst coated membrane and the mesh layer from the acid or base bath; and rinsing the at least two sets of the acid or base treated catalyst coated membrane and the mesh layer with high purity water. An embodiment of the invention is one, any or all of prior embodiments in this paragraph up through the first embodiment in this paragraph further comprising drying the at least two sets of the acid or base treated catalyst coated membrane and the mesh layer. An embodiment of the invention is one, any or all of prior embodiments in this paragraph up through the first embodiment in this paragraph further comprising hot-pressing the dried at least two sets of the acid or base treated catalyst coated membrane. An embodiment of the invention is one, any or all of prior embodiments in this paragraph up through the first embodiment in this paragraph further comprising placing a second layer of mesh on a second side of the catalyst coated membrane before soaking the at least two sets of the catalyst coated membrane and the mesh layer in the acid or base bath. An embodiment of the invention is one, any or all of prior embodiments in this paragraph up through the first embodiment in this paragraph wherein the at least two sets of the catalyst coated membrane and the mesh layer are stacked before soaking the at least two sets of the catalyst coated membrane and the mesh layer in an acid or base bath. An embodiment of the invention is one, any or all of prior embodiments in this paragraph up through the first embodiment in this paragraph further comprising placing the at least two sets of the catalyst coated membrane and the mesh layer in a multilayer mesh cage. An embodiment of the invention is one, any or all of prior embodiments in this paragraph up through the first embodiment in this paragraph further comprising placing each set of the catalyst coated membrane and the mesh layer on a separate layer of the multilayer mesh cage before soaking the at least two sets of the catalyst coated membrane and the mesh layer in the acid or base bath. An embodiment of the invention is one, any or all of prior embodiments in this paragraph up through the first embodiment in this paragraph wherein rinsing the at least two sets of the acid or base treated catalyst coated membrane and mesh layer with the high purity water comprises rinsing the at least two sets of the acid or base treated catalyst coated membrane and mesh layer with the high purity water in the multilayer mesh cage. An embodiment of the invention is one, any or all of prior embodiments in this paragraph up through the first embodiment in this paragraph further comprising drying the at least two sets of the rinsed acid or base treated catalyst coated membrane and mesh layer in the multilayer mesh cage. An embodiment of the invention is one, any or all of prior embodiments in this paragraph up through the first embodiment in this paragraph wherein a plurality of the multilayer mesh cages are placed in the acid or base bath. An embodiment of the invention is one, any or all of prior embodiments in this paragraph up through the first embodiment in this paragraph wherein the multilayer mesh cage is made of a plastic. An embodiment of the invention is one, any or all of prior embodiments in this paragraph up through the first embodiment in this paragraph wherein the plastic is made of nylon, polyimide, polyether-imide, polyethylene, polypropylene, polyethylene-co-poly-propylene, polyamide, poly(vinyl chloride), polycarbonate, polylactic acid, polyethylene terephthalate, poly(ether ether ketone), poly(methyl methacrylate), polyphenylene sulfone, polysulfone, polyethersulfone, polystyrene, poly(vinyl acetate), polychlorotrifluoroethylene, polytetrafluoroethyl-ene, acrylonitrile butadiene styrene, poly(vinylidene fluo-ride), or combinations thereof. An embodiment of the invention is one, any or all of prior embodiments in this paragraph up through the first embodiment in this paragraph wherein the mesh layer is made of a plastic. An embodiment of the invention is one, any or all of prior embodiments in this paragraph up through the first embodiment in this paragraph wherein the plastic is made of nylon, polyimide, polyether-imide, polyethylene, polypropylene, polyethylene-co-poly-propylene, polyamide, poly(vinyl chloride), polycarbonate, polylactic acid, polyethylene terephthalate, poly(ether ether ketone), poly(methyl methacrylate), polyphenylene sulfone, polysulfone, polyethersulfone, polystyrene, poly(vinyl acetate), polychlorotrifluoroethylene, polytetrafluoroethyl-ene, acrylonitrile butadiene styrene, poly(vinylidene fluo-ride), or combinations thereof. An embodiment of the invention is one, any or all of prior embodiments in this paragraph up through the first embodiment in this paragraph further comprising circulating the acid or base in the acid or base bath. An embodiment of the invention is one, any or all of prior embodiments in this paragraph up through the first embodiment in this paragraph wherein rinsing the at least two sets of the acid or base treated catalyst coated membrane and the mesh layer with the high purity water comprises placing the at least two sets of the acid or base treated catalyst coated membrane and mesh layer in a high purity water bath. An embodiment of the invention is one, any or all of prior embodiments in this paragraph up through the first embodiment in this paragraph further comprising cir-culating the high purity water in the high purity water bath. An embodiment of the invention is one, any or all of prior embodiments in this paragraph up through the first embodi-ment in this paragraph wherein the catalyst coated mem-brane is a catalyst coated proton exchange membrane or a catalyst coated anion exchange membrane. An embodiment of the invention is one, any or all of prior embodiments in this paragraph up through the first embodiment in this paragraph wherein the acid bath comprises an aqueous acid solution with an acid concentration in a range of 0.01 M to 10 M and wherein the base bath comprises an aqueous base solution with a base concentration in a range of 0.01 M to 10 M.

A second embodiment of the invention is a method of post-treating a catalyst coated membrane comprising pro-viding a catalyst coated membrane; placing a layer of mesh on both sides of the catalyst coated membrane forming a mesh covered catalyst coated membrane; providing a mul-tilayer mesh cage; placing a plurality of the mesh covered catalyst coated membranes in the multilayer mesh cage; placing the multilayer mesh cage containing the mesh cov-ered catalyst coated membrane in an acid or base bath and soaking the mesh covered catalyst coated membrane form-ing a plurality of mesh covered acid or base treated catalyst coated membranes; removing the plurality of mesh covered acid or base treated catalyst coated membranes from the acid or base bath; rinsing the plurality of mesh covered acid or base treated catalyst coated membranes with high purity water; and drying the plurality of mesh covered acid or base treated catalyst coated membranes.

Without further elaboration, it is believed that using the preceding description that one skilled in the art can utilize the present invention to its fullest extent and easily ascertain the essential characteristics of this invention, without depart-ing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A method of post-treating a catalyst coated membrane comprising:

providing a catalyst coated membrane;

placing a layer of mesh on a side of the catalyst coated membrane;

soaking at least two sets of the catalyst coated membrane and the mesh layer in an acid or base bath forming at least two sets of an acid or base treated catalyst coated membrane and the mesh layer;

removing the at least two sets of the catalyst coated membrane and the mesh layer from the acid or base bath; and rinsing the at least two sets of the acid or base treated catalyst coated membrane and the mesh layer with high purity water, wherein the at least two sets of the catalyst coated membrane and the mesh layer are stacked before soaking the at least two sets of the catalyst coated membrane and the mesh layer in an acid or base bath.

2. The method of claim 1 further comprising:

drying the at least two sets of the acid or base treated catalyst coated membrane and the mesh layer.

3. The method of claim 2 further comprising:

hot-pressing the dried at least two sets of the acid or base treated catalyst coated membrane.

4. The method of claim 1 further comprising:

placing a second layer of mesh on a second side of the catalyst coated membrane before soaking the at least two sets of the catalyst coated membrane and the mesh layer in the acid or base bath.

5. The method of claim 1 further comprising:

placing the at least two sets of the catalyst coated membrane and the mesh layer in a multilayer mesh cage.

6. The method of claim 5 further comprising:

placing each set of the catalyst coated membrane and the mesh layer on a separate layer of the multilayer mesh cage before soaking the at least two sets of the catalyst coated membrane and the mesh layer in the acid or base bath.

7. The method of claim 5 wherein rinsing the at least two sets of the acid or base treated catalyst coated membrane and mesh layer with the high purity water comprises rinsing the at least two sets of the acid or base treated catalyst coated membrane and mesh layer with the high purity water in the multilayer mesh cage.

8. The method of claim 5 further comprising:

drying the at least two sets of the rinsed acid or base treated catalyst coated membrane and mesh layer in the multilayer mesh cage.

9. The method of claim 5 wherein a plurality of the multilayer mesh cages are placed in the acid or base bath.

10. The method of claim 5 wherein the multilayer mesh cage is made of a plastic.

11. The method of claim 10 wherein the plastic comprises nylon, polyimide, polyetherimide, polyethylene, polypropylene, polyethylene-co-polypropylene, polyamide, poly (vinyl chloride), polycarbonate, polylactic acid, polyethylene terephthalate, poly(ether ether ketone), poly(methyl methacrylate), polyphenylene sulfone, polysulfone, polyethersulfone, polystyrene, poly(vinyl acetate), polychlorotrifluoroethylene, polytetrafluoroethylene, acrylonitrile butadiene styrene, poly(vinylidene fluoride), or combinations thereof.

12. The method of claim 1 wherein the mesh layer is made of a plastic.

13. The method of claim 12 wherein the plastic comprises nylon, polyimide, polyetherimide, polyethylene, polypropylene, polyethylene-co-polypropylene, polyamide, poly (vinyl chloride), polycarbonate, polylactic acid, polyethylene terephthalate, poly(ether ether ketone), poly(methyl methacrylate), polyphenylene sulfone, polysulfone, polyethersulfone, polystyrene, poly(viny 1 acetate), polychlorotrifluoroethylene, polytetrafluoroethylene, acrylonitrile butadiene styrene, poly(vinylidene fluoride), or combinations thereof.

14. The method of claim 1 further comprising:

circulating the acid or base in the acid or base bath.

15. The method of claim 1 wherein rinsing the at least two sets of the acid or base treated catalyst coated membrane and the mesh layer with the high purity water comprises placing the at least two sets of the acid or base treated catalyst coated membrane and mesh layer in a high purity water bath.

16. The method of claim 15 further comprising:

circulating the high purity water in the high purity water bath.

17. The method of claim 1 wherein the catalyst coated membrane is a catalyst coated proton exchange membrane or a catalyst coated anion exchange membrane.

18. The method of claim 1 wherein the acid bath comprises an aqueous acid solution with an acid concentration in a range of 0.01 M to 10 M and wherein the base bath comprises an aqueous base solution with a base concentration in a range of 0.01 M to 10 M.

19. A method of post-treating a catalyst coated membrane comprising:

providing a catalyst coated membrane; placing a layer of mesh on both sides of the catalyst coated membrane forming a mesh covered catalyst coated membrane;

providing a multilayer mesh cage;

placing a plurality of the mesh covered catalyst coated membranes in the multilayer mesh cage;

placing the multilayer mesh cage containing the mesh covered catalyst coated membrane in an acid or base bath and soaking the mesh covered catalyst coated membrane forming a plurality of mesh covered acid or base treated catalyst coated membranes;

removing the plurality of mesh covered acid or base treated catalyst coated membranes from the acid or base bath;

rinsing the plurality of mesh covered acid or base treated catalyst coated membranes with high purity water; and drying the plurality of mesh covered acid or base treated catalyst coated membranes.

* * * * *